United States Patent [19]
Hohnsel

[11] 3,805,866
[45] Apr. 23, 1974

[54] SKID-PREVENTING STUD DEVICE FOR INSERTION INTO TIRES

[75] Inventor: Gustav Hohnsel, Ludenscheid, Germany

[73] Assignee: Brown, Boveri & Cie, A.G., Mannheim, Germany

[22] Filed: Aug. 23, 1972

[21] Appl. No.: 282,997

[30] Foreign Application Priority Data
Sept. 7, 1971 Germany............................ 2144619

[52] U.S. Cl. .............................................. 152/210
[51] Int. Cl. ............................................. B60c 11/14
[58] Field of Search .................................... 152/210

[56] References Cited
UNITED STATES PATENTS
3,538,970  11/1970  Shwayder........................... 152/210
3,464,476  9/1969   Scheuba et al. ................... 152/210

*Primary Examiner*—James B. Marbert
*Attorney, Agent, or Firm*—Erwin Salzer

[57] ABSTRACT

A skid-preventing stud device is formed by two parts, and only two parts, i.e., a tapered pin and a tapered sleeve-like member of a thermoplastic material into which the pin is press-fitted, projecting on one end slightly beyond the sleeve-like member. The latter exerts a re-setting action upon the pin, as a result of which the pin projects always slightly beyond the sleeve-like member, notwithstanding wear to which the pin, the sleeve-like member and the tire are subjected in use.

7 Claims, 9 Drawing Figures

3,805,866

SKID-PREVENTING STUD DEVICE FOR INSERTION INTO TIRES

BACKGROUND OF THE INVENTION

The invention refers to stud-like skid-preventing and traction-increasing means intended particularly for insertion into pneumatic tires of motor vehicles.

To be more specific, this invention refers to devices of the above description including a sleeve-like member of a plastic material having a collar of increased diameter at one end thereof, and having an axial bore forming an aperture at the end thereof opposite said collar. A pin of a hard metal is inserted into said bore, and projects through said aperture out of said bore.

Prior art stud-like traction-increasing and skid-preventing devices of the above description are subject to various limitations and drawbacks. It is, therefore, the principal object of this invention to provide a stud-like device not subject to the limitations and drawbacks of prior art devices of this nature.

In one kind of prior art stud-like devices there is a significant danger of loosening and consequent loss, and of penetration of sand and brine into the gap formed between the tire and its stud-like insert.

Another prior art traction-increasing stud-device includes a friction member of a hard metal having serially arranged points of reduced cross-section where the friction member is supposed to break-off from time to time. The cost of manufacture of such a friction member is relatively high. It is not possible to insert the friction member into a plastic sleeve wherein it is supposed to be arranged. The sleeve must be formed around the friction member which greatly increases the cost of manufacture. The portions of the friction member which break-off from time to time are a source of danger on the highways.

It is a specific object of this invention to provide a stud-device which is free from the limitations and drawbacks of the above referred-to prior art stud-device.

The objects of the present invention include providing a traction-increasing pin-device that is simple and can be manufactured at moderate cost, that minimizes road noises, that is light in weight, is progressively self-adjusting as it is progressively subjected to ever increasing wear, requires a minimum of metal, etc. These and other objects of the invention will become more apparent as this specification progresses.

SUMMARY OF THE INVENTION

A traction-increasing means intended particularly for use on pneumatic tires of motor vehicles includes a sleeve-like member of a plastic material having a collar of increased diameter on one end thereof and having an axial bore forming an aperture at the end thereof opposite said collar. A pin of a hard metal is inserted into said bore and projects through said aperture out of said bore. The pin of a hard metal is tapered. The bore in the sleeve-like member into which the pin is inserted is tapered in the region thereof engaged by the pin and the latter is press-fitted into the bore. The aforementioned bore has a cylindrical extension adjacent the converging end of said pin having a smaller diameter than the end surface of said pin at said converging end thereof so that a shoulder is formed between said tapered region of said bore and said cylindrical extension thereof. Said cylindrical extension of said bore is closed by a bottom portion at the end thereof juxtaposed to said converging end of said pin.

DESCRIPTION OF PREFERRED EMBODIMENTS

Figure 1:
FIG. 1 is a front elevation of a pin of a hard metal forming part of the traction-increasing and skid-preventing stud-like device according to the present invention.

In the drawings reference numeral 1 has been applied to indicate a sleeve-like member of a plastic material, preferably a thermoplastic synthetic resin. The choice of any particular thermoplastic resin depends upon the particular performance characteristics required in the instant case. One of the characteristics consists in the ability to exert resetting forces upon pin 2 made of a hard metal such as, for instance, steel inserted into sleeve-like member 1. Another property required of a thermoplastic resin for part 1 consists in that its wear resistance is of the same order as the wear resistance of the surface of a tire into which part 1 is inserted. The bending strength of the synthetic resin of which part 1 is made ought to be such that it does not bend significantly in normal use under the action of forces in a direction transverse to the longitudinal axis thereof, or bend to an extent which may damage pin 2. Pin 2 is slightly tapered along its entire length. Part 1 is provided with a tapered bore 3 for receiving pin 2 and pin 2 is press-fitted into bore 3. Reference character 4 has been applied to indicate the tapered region of bore 3 which is engaged by pin 2. The taper of pin 2 exceeds slightly the taper of the surface 4 prior to insertion of pin 2 into part 1 to improve the press-fit between both parts. The tapered portion 4 of bore 3 is followed by a cylindrical coaxial extension 5 of said bore. Extension 5 is arranged adjacent the converging end of pin 2 and has a smaller diameter than the end surface of pin 2 at the converging end thereof. As a result, a shoulder is formed between the tapered region 4 of bore 3 and the cylindrical extension 5 thereof. Cylindrical extension 5 of bore 3 is closed by a bottom portion 6 at the end thereof juxtaposed to the converging end of pin 2. Bottom portion 6 is an integral part of sleeve-like member 1. Member 1 is provided at its lower end with a collar 7 of increased diameter. This collar secures parts 1, 2 to the body of a tire 10 when inserted into a pre-formed bore in the surface thereof, as shown in FIG. 9.

Figure 3:
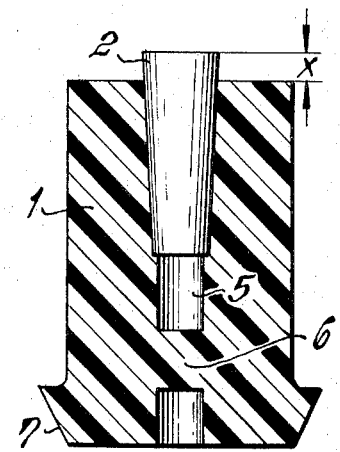
FIG. 3 shows the structure of FIG. 2 upon insertion into it of the pin shown in FIG. 1, the former being shown in longitudinal section and the latter in front elevation.
Figure 2:
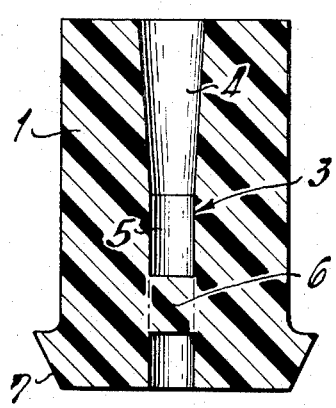
FIG. 2 is a longitudinal section of a sleeve-like member embodying this invention intended to receive the pin shown in FIG. 1.
Figure 4:
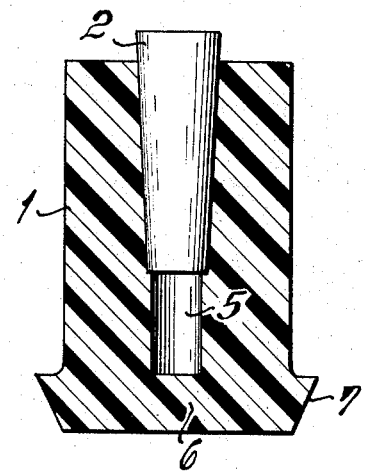
FIG. 4 shows a modification of the assembly of FIG. 3 in the same fashion as FIG. 3.

When parts 1, 2 are inserted into the body of a tire the radially outer ends thereof are subjected to progressive wear. The position of pin 2 relative to sleeve-like member 1 depends upon the magnitude of the axial resetting forces exerted by the latter upon the former. These resetting forces depend inter alia upon the diameter of the cylindrical portion 5 of bore 3. The diameter of portion 5 of bore 3 should be selected in such a way that pin 2 projects initially 1 to 1.5 millimeters beyond the upper surface of member 1 when there has been no wear on parts 1 and 2. Bottom part 6 receives the reaction to the above referred-to resetting forces. These forces increase progressively the more part 2 is caused to penetrate into the cylindrical portion 5 of bore 3, and further depend upon the diameter of portion 5 of bore 3, and the geometry of parts 1 and 2 including that of bottom portion 6 and, therefore, can be controlled, as desired. They ought to be controlled in such a way that the distance X (FIG. 3) between the wide end surface of pin 2 and the adjacent end surface of sleeve-like member 1 which is initially 1 to 1.5 millimeters remains in that range as the wear of parts 1 and 2 progresses.

Figure 9:
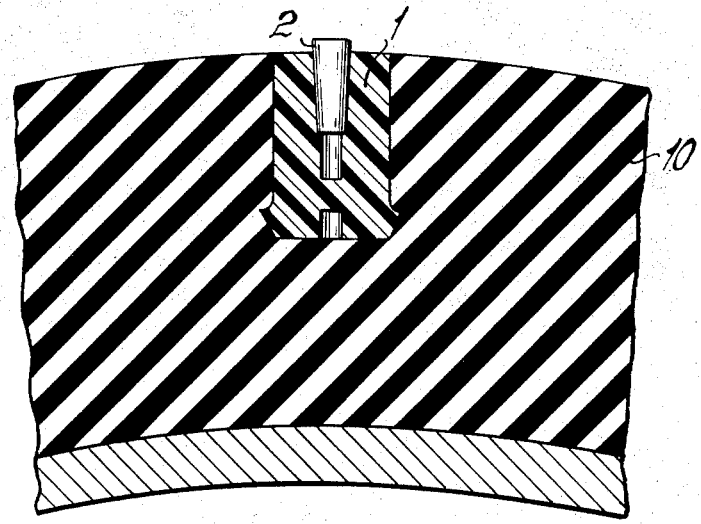
FIG. 9 shows the structure of FIG. 3 in the same fashion as FIG. 3 upon insertion thereof into the tire of a motor vehicle.

When inserting parts 1, 2 into the body of a tire 10 the outer surface of part 1 is arranged flush with that of the tire, as clearly shown in FIG. 9.

As is apparent from the above the distance X, i.e. the distance of pin 2 projecting beyond part 1 ought to be about 1 to 1.5 millimeters (or about 1/25 to 3/50 inch) in the initial state of the device. In that state the extent of penetration of pin 2 into part 1 ought to be substantially coextensive with the tapered region 4 of bore 5. The aforementioned depth of penetration may, however, be less than the length of the tapered region 4 of bore 5.

Figure 5:
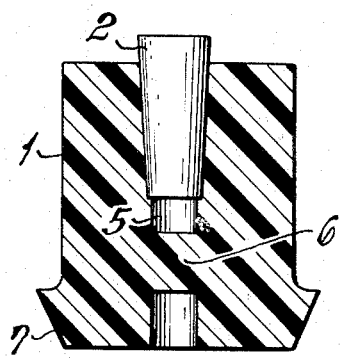
FIG. 5 shows the same structure as FIG. 3 in the same fashion as FIG. 3 upon having undergone a great deal of wear, resulting in a shortening of the pin shown in FIG. 1, a shortening of the sleeve-like member shown in FIG. 2, and in a re-setting of the former.
Figure 6:
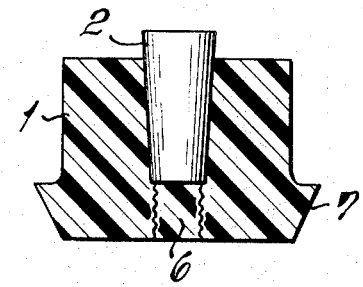
FIG. 6 shows the structure of FIGS. 3 and 5 in a state of progressive wear, resulting in a shearing action upon, and a compression of, the bottom of the pin-receiving member.

As is apparent from FIGS. 5 and 6, both parts 1 and 2 have undergone substantial wear resulting in a reduction of the length thereof. Both FIGS. 5 and 6 show that pin 2 projects still beyond part 1 on account of the resetting action of the latter. In the state of the device shown in FIG. 6 pin 2 has engaged the bottom 6 of part 1, has compressed the former and broken it off from the main body of part 1 by a shearing action imposed upon bottom 6.

Figure 7:
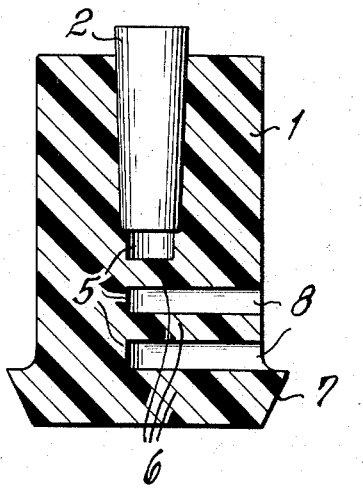
FIG. 7 shows a modification of the structure of FIG. 3 in the same fashion as FIG. 3.

In the embodiments of the invention shown in FIGS. 6 and 7 the same numerals as in FIGS. 1 to 6 have been applied to indicate like parts. Hence FIGS. 7 and 8 require detailed description only to the extent that the structures shown therein differ from those previously described.

Referring now to FIG. 7, tapered pin 2 is inserted in a tapered bore of sleeve-like member 1. The tapered bore filled by pin 2 has a cylindrical extension 5 of reduced diameter. Reference character 7 has been applied to indicate a collar of part 1, integral with part 1, having a larger diameter than the upper portion of part 1 receiving pin 2. Part 1 is provided with a pair of recesses 8 projecting transversely to the axis of part 1. Part 1 is a molded piece and recesses 8 are formed therein by a pair of laterally removable inserts. The width of recesses 8 is equal to the diameter of cylindrical bore or passageway 5. As a result of the presence of recesses 8 bore 5 has three bottom portions to which reference numerals 6 have been applied. The thickness of these bottom portions 6 increases progressively as their distance from pin 2 increases.

Figure 8:
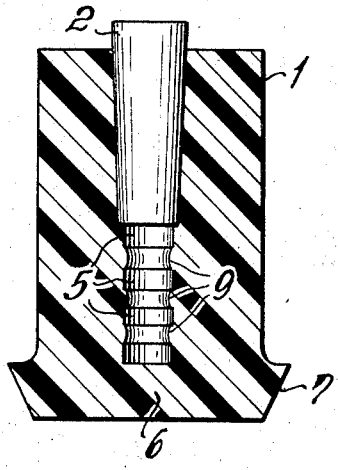
FIG. 8 shows another modification of the structure of FIG. 3 in the same fashion as FIG. 3.

FIG. 8 shows sleeve-like member 1 engaged by tapered pin 2 and provided with a collar 7 of increased diameter. Member 1 is provided with a coaxial cylindrical bore 5 closed by bottom portion 6. Sleeve-like member 1 has pin-engaging means projecting radially inwardly into cylindrical bore 5. These means are preferably in the form of annular projections 9 reducing the inner diameter of cylindrical bore 5 at axially spaced points thereof.

I claim as my invention:

1. A traction increasing means, particularly for pneumatic tires of motor vehicles, including a sleeve-like member of a plastic material having a collar of increased diameter at one end thereof and having an axial bore forming an aperture at the end thereof opposite said collar and a pin of a hard metal inserted into said bore and projecting through said aperture out of said bore wherein the improvement comprises a. a tapered pin of hard metal;
   b. a bore in said sleeve-like member of a plastic material tapered in the region thereof in direct physical engagement with said pin, said pin being press-fitted into said bore;
   c. said bore having a cylindrical extension adjacent the converging end of said pin having a smaller diameter than the end surface of said pin at said converging end thereof so that a shoulder is formed between said tapered region of said bore and said cylindrical extension thereof; and
   d. said cylindrical extension of said bore being closed by a bottom portion at the end thereof juxtaposed to said converging end of said pin, whereby said pin is progressively reset by axial resetting forces exerted by said sleeve-like member of plastic material as the wear of said pin and of said member of plastic material progress.

2. Means as specified in claim 1 wherein the taper of said tapered region of said bore prior to insertion of said pin exceeds the taper of said pin so as to establish a firm press-fit between said pin and said sleeve-like member.

3. Means as specified in claim 1 wherein said pin projects 1 to 1.5 millimeters beyond said sleeve-like member and wherein the extent of penetration thereof into said sleeve-like member is substantially coextensive with said tapered region of said bore.

4. Means as specified in claim 3 wherein the extent of penetration of said pin is less than the length of said tapered region of said bore.

5. Means as specified in claim 1 including a plurality of axially spaced bottom portions at the end of said bore juxtaposed to said converging end of said pin.

6. Means as specified in claim 1 wherein said cylindrical extension of said bore is provided with means projecting radially inwardly into said extension and forming integral parts of said sleeve-like member.

7. Means as specified in claim 6 wherein said cylindrical extension of said bore is provided with annular projections reducing the inner diameter of said cylindrical extension at axially spaced points thereof.

* * * * *